(12) United States Patent
Naito et al.

(10) Patent No.: US 6,842,352 B2
(45) Date of Patent: Jan. 11, 2005

(54) INVERTER MODULE FOR TRAIN TRACTION SYSTEMS

(75) Inventors: Kazushi Naito, Hitachinaka (JP); Nobuaki Mizuguchi, Hitachinaka (JP); Hiroyuki Ozawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/347,275

(22) Filed: Jan. 21, 2003

(65) Prior Publication Data

US 2004/0141347 A1 Jul. 22, 2004

(51) Int. Cl.[7] .............................................. H02H 7/122
(52) U.S. Cl. .................. 363/56.01; 363/132; 363/56.04
(58) Field of Search ........................ 363/56.01, 56.02, 363/56.03, 56.04, 57, 98, 132

(56) References Cited

U.S. PATENT DOCUMENTS 4,672,525 A * 6/1987 Horie et al. ................... 363/58
5,945,802 A * 8/1999 Konrad et al. ............... 318/807

FOREIGN PATENT DOCUMENTS

JP 11-220869 8/1999

* cited by examiner

Primary Examiner—Bao Q. Vu
(74) Attorney, Agent, or Firm—Antonelli, Terry, Stout & Kraus, LLP

(57) ABSTRACT

An inverter module for an electric railcar includes an inverter composed of three 2 in 1 IGBTs, a breaker composed of semiconductor line breaker, and a dry filter capacitor, wherein one inverter corresponds to a single motor. The inverter is a snubberless inverter omitting a snubber capacitor, and a main circuit connecting the output of the inverter to the motor is a coaxial cable. The main circuit and the interior of the inverter is connected via a connector instead of a conventional terminal block.

10 Claims, 6 Drawing Sheets

INVERTER MODULE FOR TRAIN TRACTION SYSTEMS

FIELD OF THE INVENTION

The present invention relates to an inverter module (module-type inverter device) to be mounted on an electric railcar.

DESCRIPTION OF THE RELATED ART

Heretofore, an inverter for an electric railcar is basically used to control a plurality of motors by a single control unit. The structure of such prior art inverter is explained with reference to FIG. 5 illustrating in simplified view the method of mounting the inverter to a circuit, and to FIG. 6 showing the external appearance thereof in perspective view.

An inverter box 100 storing a power unit and the like is equipped with a terminal block 150 connected to an inverter device, the inverter device being connected via the terminal block 150 to a wiring 20 connected with a direct current (DC) power supply and to a wiring 41 connected with motors.

Since such prior art inverter device for an electric railcar is designed to control more than two motors with a single device, the design of the inverter device must be altered according to each specific use, and the designing process takes up much time.

Moreover, the conventional inverter utilizes an oil capacitor as filter capacitor, comprises six IGBTs (insulated gate bipolar transistors), and includes a snubber capacitor, by which the inverter device becomes large and heavy, the mounting operation of the device complicated.

Another drawback of the conventional inverter is that in + and − wiring 20 and U, V and W wiring 41, each wire is composed of a single electric wire that extend throughout the whole length, so there are many wires to be connected during the connecting operation. Furthermore, since the above-mentioned wires are connected to the in-box wiring by fixing the wires with bolts to the terminal block 15 formed of an insulator, the workload related to connecting wires is excessive.

An aluminum duct 45 is used to store the wiring 20 and wiring 41 connected to the inverter and extending to various devices, so as to reduce noise leaking to the exterior. The aluminum duct must have a complex structure, so manufacture of the aluminum duct requires much cost.

Yet another drawback of the conventional inverter is that it is not linked with the railcar information control unit, so it is difficult for the inverter to adopt to formation control appropriately.

SUMMARY OF THE INVENTION

The present invention aims at solving the above-mentioned problems that the prior art inverter device for an electric railcar holds.

In order to solve the problems, the present invention provides an inverter module for an electric railcar comprising an inverter having a plurality of switching elements, a breaker, and a filter capacitor, wherein one inverter module is designed to correspond to one motor, the inverter is a snubberless inverter omitting a snubber capacitor, and the inverter module further comprises three 2 in 1 IGBTs (insulated gate bipolar transistors) as switching elements.

According further to the present invention, the filter capacitor is a dry filter capacitor.

According even further to the present invention, the breaker is a semiconductor line breaker (LB).

According further to the present invention, a main circuit connecting output of the inverter module to the motor is a coaxial cable.

According further to the present invention, a connector is utilized instead of a conventional terminal block to connect the main circuit to the interior of the inverter.

DETAILED DESCRIPTION OF THE PREFERRED EMBODIMENT

The outline of the structure of the inverter module for an electric railcar according to the present invention will be explained with reference to FIGS. 1 through 4.

Figure 1:
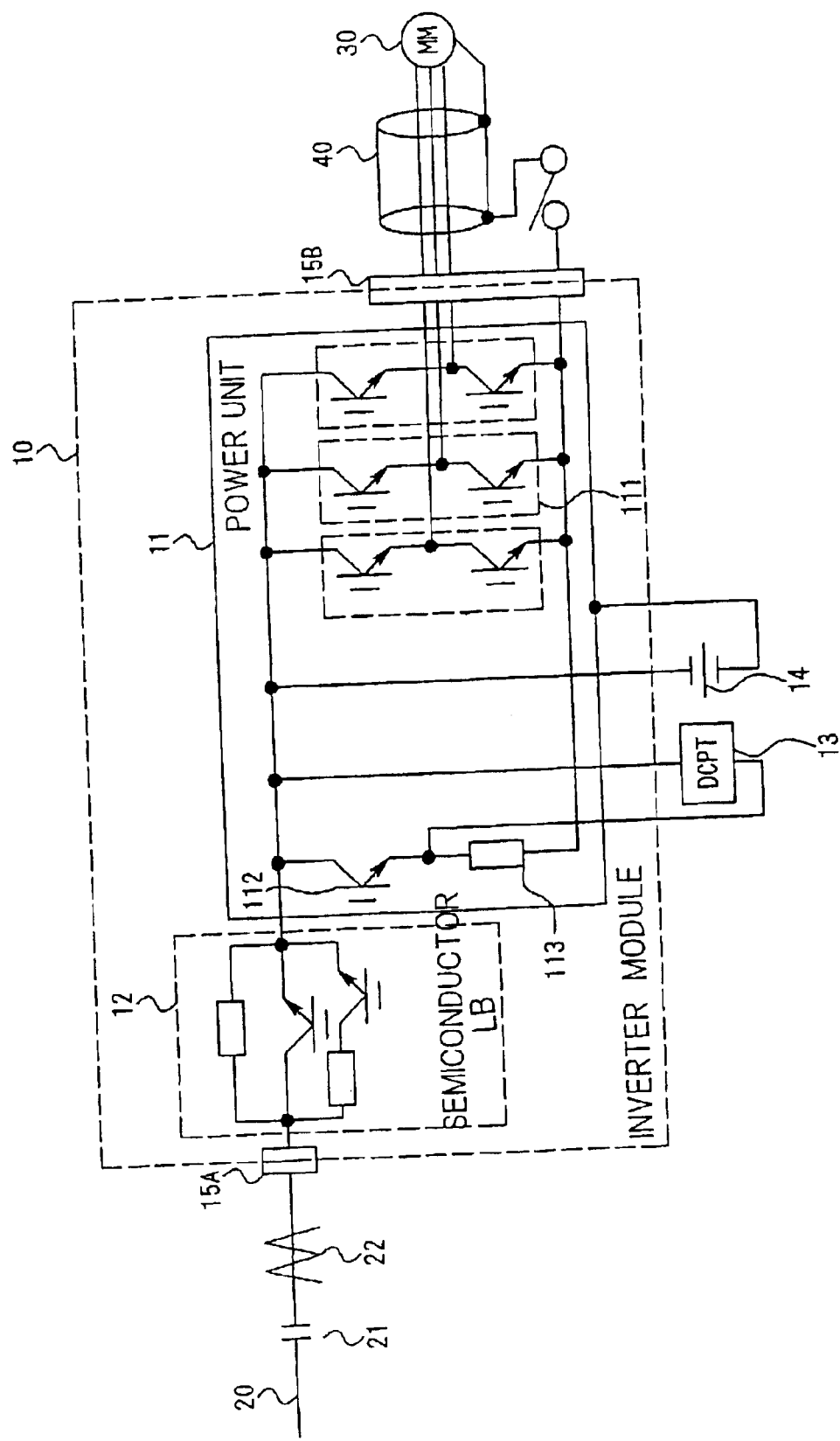
FIG. 1 is a block diagram illustrating the outline of the structure of the inverter module for an electric railcar according to the present invention.

FIG. 1 is a block diagram explaining the outline of the structure of the inverter module for an electric railcar according to the present invention. An inverter module 10 for an electric railcar comprises a power unit 11, a direct current potential transformer (DCPT) 13, a filter capacitor 14, and connectors 15A and 15B.

The power unit 11 comprises a snubberless inverter 111 omitting a snubber capacitor, an over voltage transistor (OVT) 112, an over voltage resistor (OVR) 113 with low losses, and a semiconductor line breaker 12.

The filter capacitor 14 is composed of a dry filter capacitor, which advantageously enables to reduce the size and the weight of the inverter compared to a filter capacitor utilizing a conventional oil capacitor.

The connector 15A is connected to a main circuit, and is connected to a DC power supply 20 through an electromagnetic contactor 21 and a current transformer (CT) 22. The connector 15B is connected to a motor 30 via a three-phase coaxial cable 40. By utilizing the three-phase coaxial cable 40 and the connector 15, the inverter module can omit an insulating terminal block for connecting the main circuit with the in-box wiring, the connecting operation becomes simplified, and the inverter module can be miniaturized.

In contrast to a conventional inverter having six IGBTs, the snubberless inverter used in the present invention comprises 2 in 1 type switching elements where two IGBTs are combined as one element, so together with the fact that snubber capacitor and snubber resistor can be omitted according to the present invention, the height of the present module can be reduced significantly compared to that of the conventional apparatus.

Figure 2:
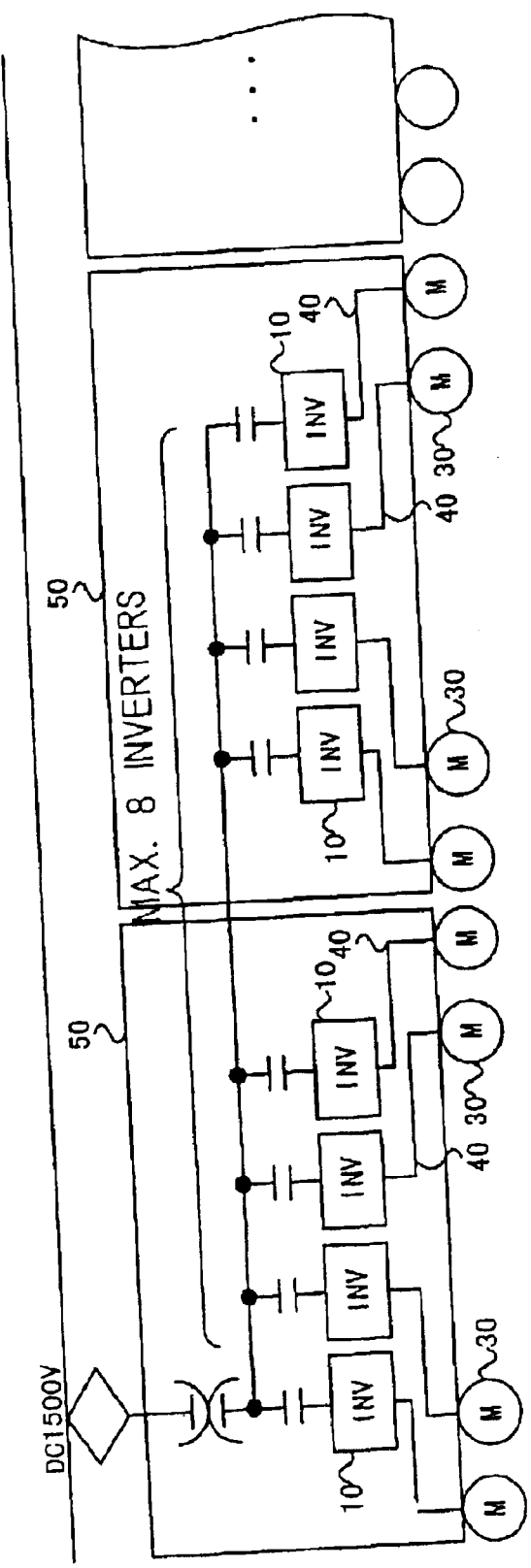
FIG. 2 is an explanatory view showing the structure of an electric car utilizing the modular inverter device of the present invention.
Figure 3:
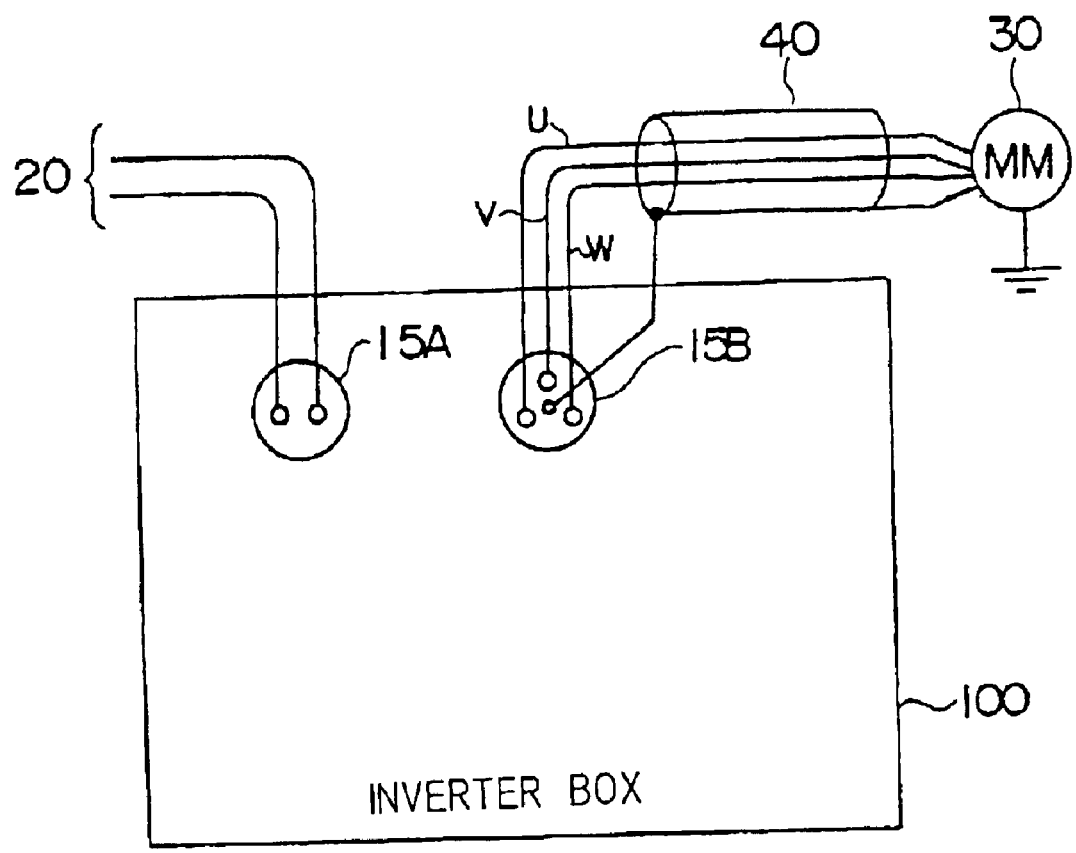
FIG. 3 is a front view explaining the concept of the connector formation of the inverter module according to the present invention.
Figure 4:
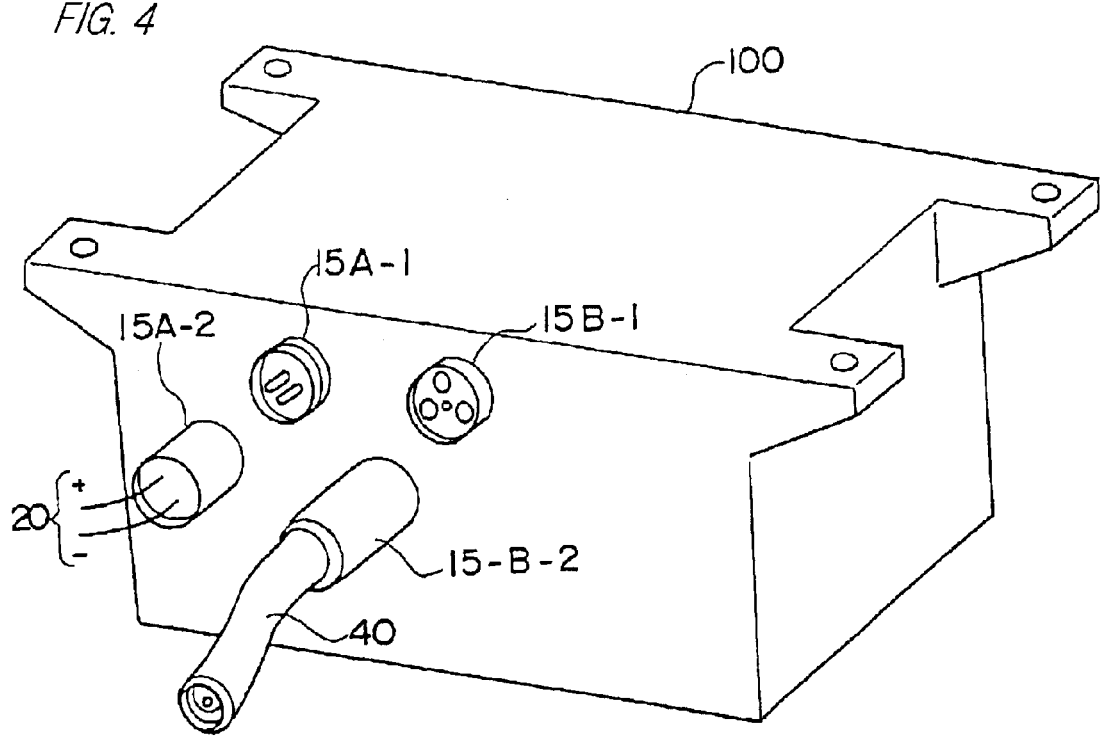
FIG. 4 is a perspective view illustrating the concept of the connector formation of the inverter module according to the present invention.
Figure 5:
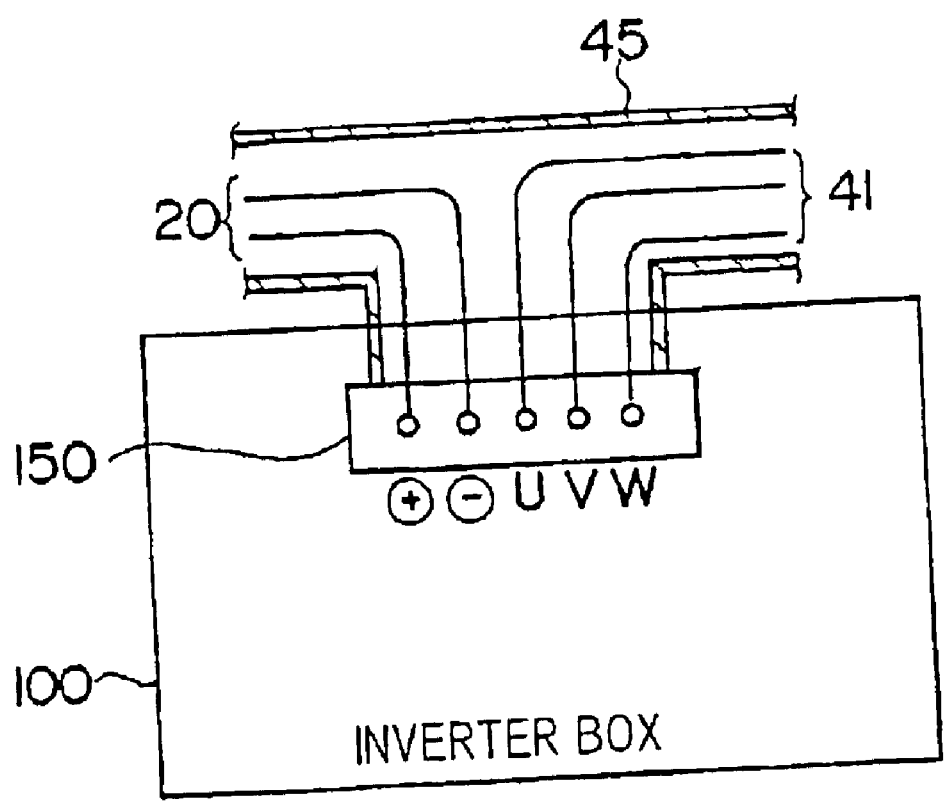
FIG. 5 is a schematic plan view illustrating the outline of the structure of a prior art inverter device for an electric railcar.
Figure 6:
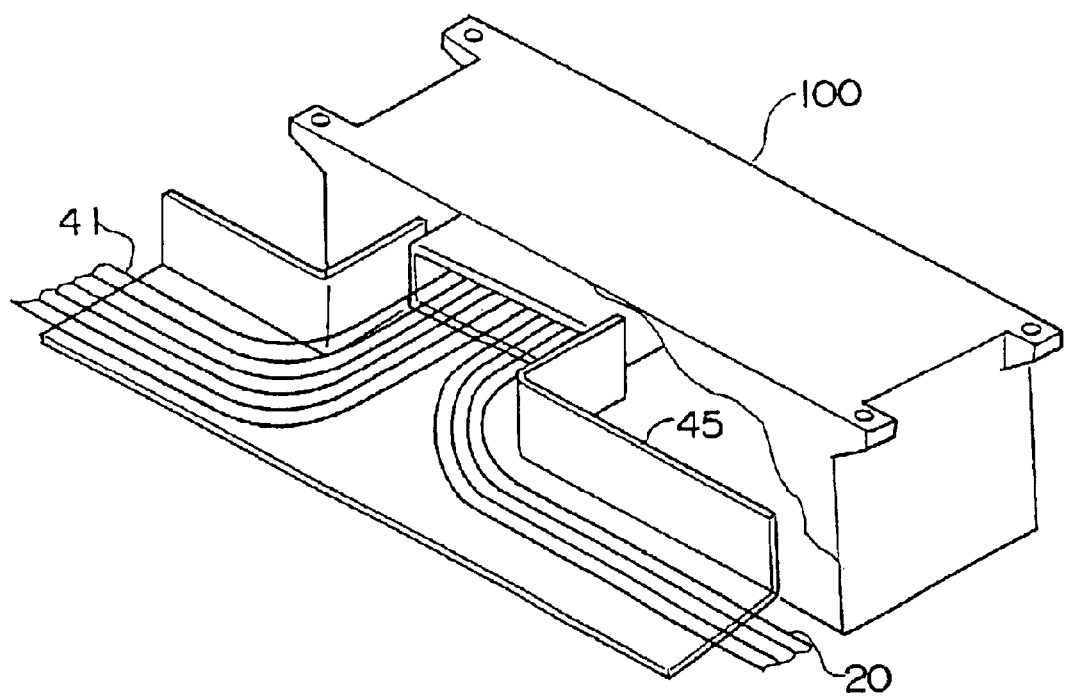
FIG. 6 is a schematic perspective view showing the outline of the structure of a prior art inverter device for an electric railcar.

With reference to FIG. 2, an example of the formation of an electric railcar utilizing the inverter module of the present invention will now be explained. Each electric railcar 50 comprises four motors 30, and modular inverter devices 10 each one corresponding to a single motor 30. The inverter device 10 and the motor 30 are connected by a three-phase coaxial cable 40. As shown in FIGS. 3 and 4 illustrating the structure of a connector portion 15, a DC power supply-side connector 15A and a three-phase AC (alternating current)-side connector 15B are fixed to one side surface of a connector box 100.

The three-phase coaxial cable 40 has a grounding wire on its outermost layer, so by grounding the same using a grounding switch 16, the influence of noise can be reduced.

With the above-mentioned structure, the modular inverter device of an electric railcar according to the present invention can have a significantly reduced size of approximately 700 mm in width, 500 mm in height and 600 mm in depth, for example, and the weight can be reduced to 140 kg.

According to the present invention, a single motor control (1C1M control) is made possible, enabling the converter to correspond to various uses.

According further to the present invention, 2 in 1 type IGBTs are utilized to constitute a snubberless inverter, which advantageously minimizes the number of parts required to form the main circuit and reduces the weight and size of the inverter.

According to the present invention, a semiconductor line breaker is utilized as breaker, enabling the present inverter to be highly functional and maintenance-free.

According further to the present invention, a three-phase coaxial cable is used so as to advantageously omit the aluminum duct and thereby simplify wiring operation.

According further to the present invention, the inverter device utilizes a connecter instead of the conventional contact button, so the connecting operation is simplified and the number of required parts is reduced.

What is claimed is:

1. An inverter module for an electric railcar comprises an inverter having a plurality of switching elements, a breaker, and a filter capacitor, wherein one inverter module is designed to correspond to one motor, said inverter is a snubberless inverter omitting a snubber capacitor, and said inverter module further comprises three 2 in 1 IGBTs as switching elements.

2. An inverter module as claimed in claim 1, wherein the filter capacitor is a dry filter capacitor.

3. An inverter module as claimed in claim 1, wherein the breaker is a semiconductor line breaker.

4. An inverter module as claimed in claim 1, wherein a main circuit connecting output of the inverter module to the motor is a coaxial cable.

5. An inverter module as claimed in claim 1, wherein a connector is utilized to connect a main circuit with an interior of the inverter module.

6. An inverter module for an electric railcar having a plurality of motors, the inverter module comprising an inverter with a plurality of switching elements, a breaker and a filter capacitor, wherein one inverter module is configured to supply power to one respective motor of the plurality of motors of the electric railcar, the inverter being a snubberless inverter omitting a snubber capacitor, and the inverter having two IGBTs combined as one element and having three of the one elements of the two IGBTs combined.

7. An inverter module as claimed in claim 6, wherein the filter capacitor is a dry filter capacitor.

8. An inverter module as claimed in claim 6, wherein the breaker is a semiconductor line breaker.

9. An inverter module as claimed in claim 6, wherein a main circuit connecting an output of the inverter module to the motor is a coaxial cable.

10. An inverter module as claimed in claim 6, wherein a connector is utilized to connect a main circuit with an interior of the inverter module.

* * * * *